United States Patent
Boyer et al.

(10) Patent No.: US 8,406,403 B2
(45) Date of Patent: *Mar. 26, 2013

(54) CONFERENCE CALL PARTICIPANT MANAGEMENT SYSTEM AND METHOD

(75) Inventors: David Boyer, Oceanport, NJ (US); Kevin Nelson, Middletown, NJ (US)

(73) Assignee: Avaya Inc., Basking Ridge, NJ (US)

( * ) Notice: Subject to any disclaimer, the term of this patent is extended or adjusted under 35 U.S.C. 154(b) by 2035 days.

This patent is subject to a terminal disclaimer.

(21) Appl. No.: 11/476,062

(22) Filed: Jun. 28, 2006

(65) Prior Publication Data

US 2007/0071203 A1 Mar. 29, 2007

Related U.S. Application Data (60) Provisional application No. 60/694,241, filed on Jun. 28, 2005.

(51) Int. Cl.
*H04M 3/42* (2006.01)
(52) U.S. Cl. .......... 379/202.01; 379/203.01; 379/201.01; 379/207.01; 379/207.13; 379/207.14
(58) Field of Classification Search ............ 379/202.01, 379/156, 198; 705/1, 16, 39, 40, 67
See application file for complete search history.

(56) References Cited

U.S. PATENT DOCUMENTS

| | | | | |
|---|---|---|---|---|
| 7,231,208 | B2* | 6/2007 | Robertson et al. | 455/416 |
| 7,403,793 | B2* | 7/2008 | Mauney et al. | 455/552.1 |
| 2004/0001579 | A1* | 1/2004 | Feinberg et al. | 379/156 |
| 2004/0022422 | A1* | 2/2004 | Yamauchi et al. | 382/115 |
| 2004/0246332 | A1* | 12/2004 | Crouch | 348/14.08 |
| 2005/0021618 | A1* | 1/2005 | Isozaki | 709/204 |
| 2005/0044384 | A1* | 2/2005 | Kimura | 713/183 |
| 2005/0063522 | A1* | 3/2005 | Kim et al. | 379/88.02 |
| 2005/0193060 | A1* | 9/2005 | Barton | 709/204 |
| 2006/0074813 | A1* | 4/2006 | Saunders | 705/67 |
| 2006/0221934 | A1* | 10/2006 | Cooke et al. | 370/352 |

* cited by examiner

*Primary Examiner* — Joseph J Nguyen
(74) *Attorney, Agent, or Firm* — Muncy, Geissler, Olds & Lowe, PLLC (57) ABSTRACT

A participant may join a conference call whenever a person specific attribute is read by an interrogator and verified as being authorized to participate in the call. The interrogator may be integrated into a telephone and manually activated or periodically activated. The attribute is an RFID tag, bar code, fingerprint, etc. Conference calls may be joined and rejoined when moving from room to room. Further, real-time participant lists may be accessed during the call and archived.

26 Claims, 6 Drawing Sheets

CONFERENCE CALL PARTICIPANT MANAGEMENT SYSTEM AND METHOD

This application is a conversion of provisional patent application 60/694,241, filed Jun. 28, 2005, the entire contents of which are herein incorporated by reference.

BACKGROUND OF THE INVENTION

1. Field of the Invention

The present invention relates to conference calls, of the telephonic, video, and/or chat room type. More particularly, the present invention relates to the automated management of a conference call, such as permitting and denying persons to participate in a conference call, and allowing an authorized person to leave and rejoin a conference call.

2. Description of the Related Art

Conference calls are common place in businesses, educational institutes, and government agencies. In a typical conference call, an originator programs or establishes a future conference call with a host server. The originator establishes a start time (and possibly an end time), a code to identify the conference call session, and usually a password. Next, the originator notifies the potential participants of the upcoming conference call.

The notification to the potential participants is usually by email, fax or conversation. The notification must include the start time of the conference call, a call-in telephone number to reach the host server, a session code (since the server is usually hosting several conference call sessions at one time), and the password. Such notification information must be saved or remembered by each potential participant until the start time of the conference call. Also, at the start time of the conference call, each participant must dial the call-in telephone number, enter the session code, and enter the password.

During the course of the conference call, it often occurs that a participant is in the privacy of her office on the speakerphone and must leave her office, such as to access an accounting invoice, obtain a file, or ask a question to another person. Once that person leaves her private office, she may wish to rejoin the conference call in the accounting department, the file room, or the other person's office. To do so, the participant must again dial the call-in number, and input the session code and password.

SUMMARY OF THE INVENTION

The present inventors have appreciated drawbacks in the state of the art conference call management systems.

One drawback is that the participants must retain and enter a substantial amount information (call-in telephone number, session code and password) in order to access the conference call. Often times, a participant misplaces the information and is late to the conference call due to the need to re-obtain the information, such as by searching through old emails or faxes, or even calling another participant. Also, it is tiresome and time consuming to enter all of the information needed to participate in the conference call.

Another drawback is the increased likelihood of unauthorized persons obtaining access to the conference call. Since the conference call information is often sent by email or fax, there is a likelihood that a printout of the information will be left on a printer, will be visible on a paper lying about a desk, or will be left visible on a computer screen. An unauthorized person may read the information and decide to eavesdrop on a conference call of interest, such as an employee performance and salary review conference call. Since, the call-in telephone number, session code and password are generic to all participants, it would be possible to call in from a remote location, and simply listen to the conference call. Typically in a telephone conference call, a new caller is announced by the host server sounding an entry tone. However, if many participants are calling in at the same time, such entry tones may not be closely monitored and/or could be ascribed to an error at the host server.

Another drawback is that if a participant needs to leave the room for a short time, such as to go to the bathroom, or to go to another floor of the office to obtain a file, that participant will be reluctant to end their participation in the conference call for their brief absence. To do so would require the returning participant to re-enter the call-in telephone number, session code and password to again participate in the conference call. Often, the participant will simply leave their private office with the conference call in progress, sometimes even on a speakerphone. Again, making a situation where eavesdropping on a conference call could be accomplished.

Another drawback occurs when a person needs to leave the conference call in one room (e.g. their office) and pick up the conference call in another room (e.g. a co-worker's office). That person must redial the telephone number of the host server, and reenter the session code and password, once they have reached the other room.

It is an object of the present invention to address one or more of the drawbacks associated with the related art.

It is an object of the present invention to scan or read a person specific attribute, which is usually or always with an employee. Such attribute will be read by a interrogator connected to a telephone, videophone or computer used to access a conference call. The information will be used to automatically connect the person to the conference call.

Alternatively, it is an object of the present invention to scan or read a conference call device specific attribute associated with the conference call device using an interrogator which is usually or always with an employee. Such attribute will be read by the interrogator carried by the employee. The attribute information will be used to automatically connect the person to the conference call.

It is another object of the present invention to uniquely identify participates as they enter a conference call. The unique identification could be automatically having the host server state the participant's name, employee number, title, or other such identification, either by playing the entrant's prerecorded voice (similar to user prerecorded voice prompts used by voicemail systems) or by synthesized voice. Alternatively, a list of participants actually in the conference call could be displayed on a display of each participant, thereby eliminating the need for entry and exit tones typical of current conference call systems.

These and other objects are accomplished by a system and method wherein a participant may join a conference call whenever a person specific attribute is read by an interrogator and verified as being authorized to participate in the conference call. The interrogator may be integrated into a telephone, personal computer, or other conference call equipment and may be manually activated or periodically activated to read nearby person specific attribute(s). The person specific attributes may be an RFID tag, bar code, etc. incorporated into an employee ID or fob. Alternatively, the person specific attribute could be a fingerprint, retina pattern, voice pattern, etc. Conference calls may be quickly and easily joined by a participant, and quickly and easily rejoined when moving from room to room. Further, a real-time participant list may be accessed during the call by a participant pressing a button and displaying the list. Further, the participant list may be archived and later reviewed to determine the participants' names, actual time or times of participation during the conference call, and location or locations during the conference call.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF PREFERRED EMBODIMENTS

Figure 1:
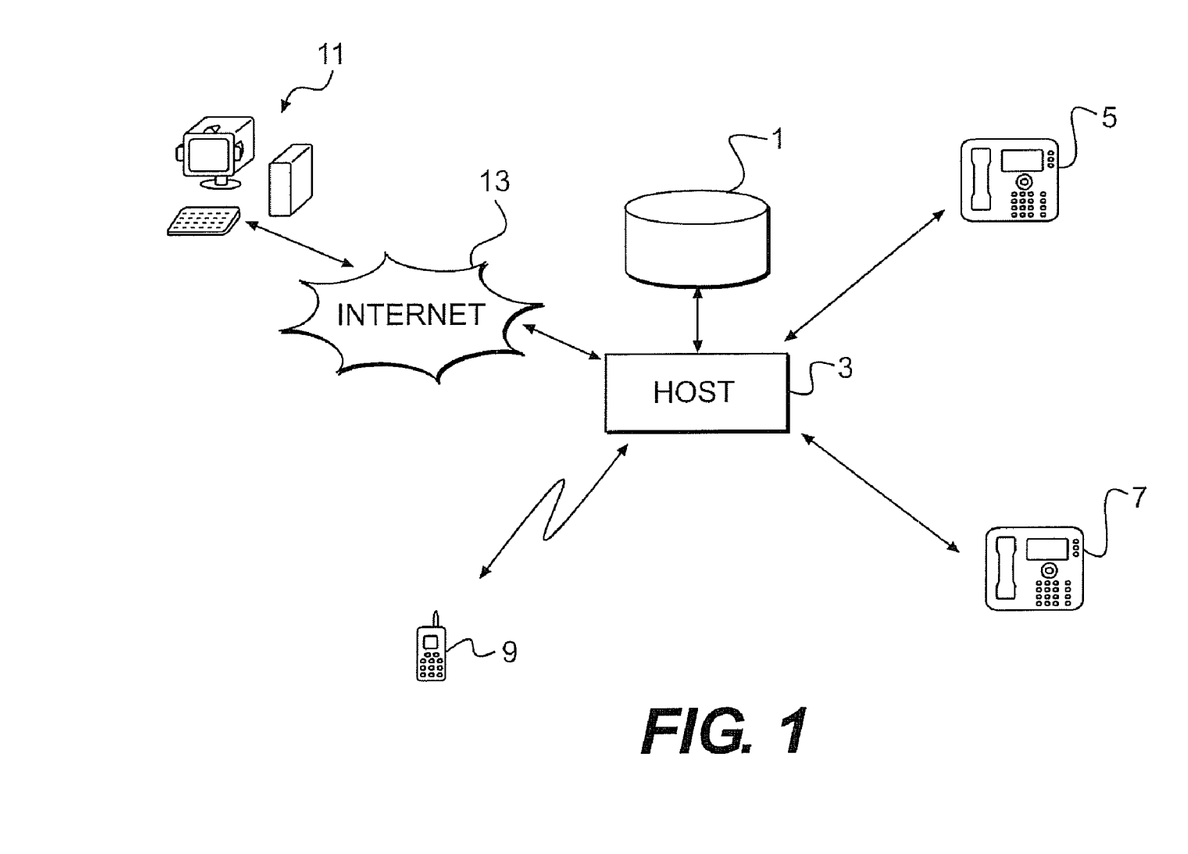
FIG. 1 is an overall system block diagram illustrating various types of participating conference call equipment, in accordance with the present invention.

FIG. 1 is an overall system block diagram illustrating various types of participating conference call equipment, in accordance with the present invention. A host 3, such as a server or other type of hardware, is connected to a memory 1 and to a plurality of telephones 5 and 7, such as desktop telephones. The host 3 may also be connected to a cellular telephone 9, and a personal computer 11, such as a desktop computer, laptop computer, or personal digital assist (PDA). The connections to the host 3 may be wired or wireless, through a publicly switched telephone network (PSTN), over a local area network (LAN), via the Internet 13, or any other known type of communication connection. Although FIG. 1 illustrates the memory 1 as a separate element from the host 3, it is within the scope of the invention that the memory 1 may be incorporated into the host 1.

Figure 2:
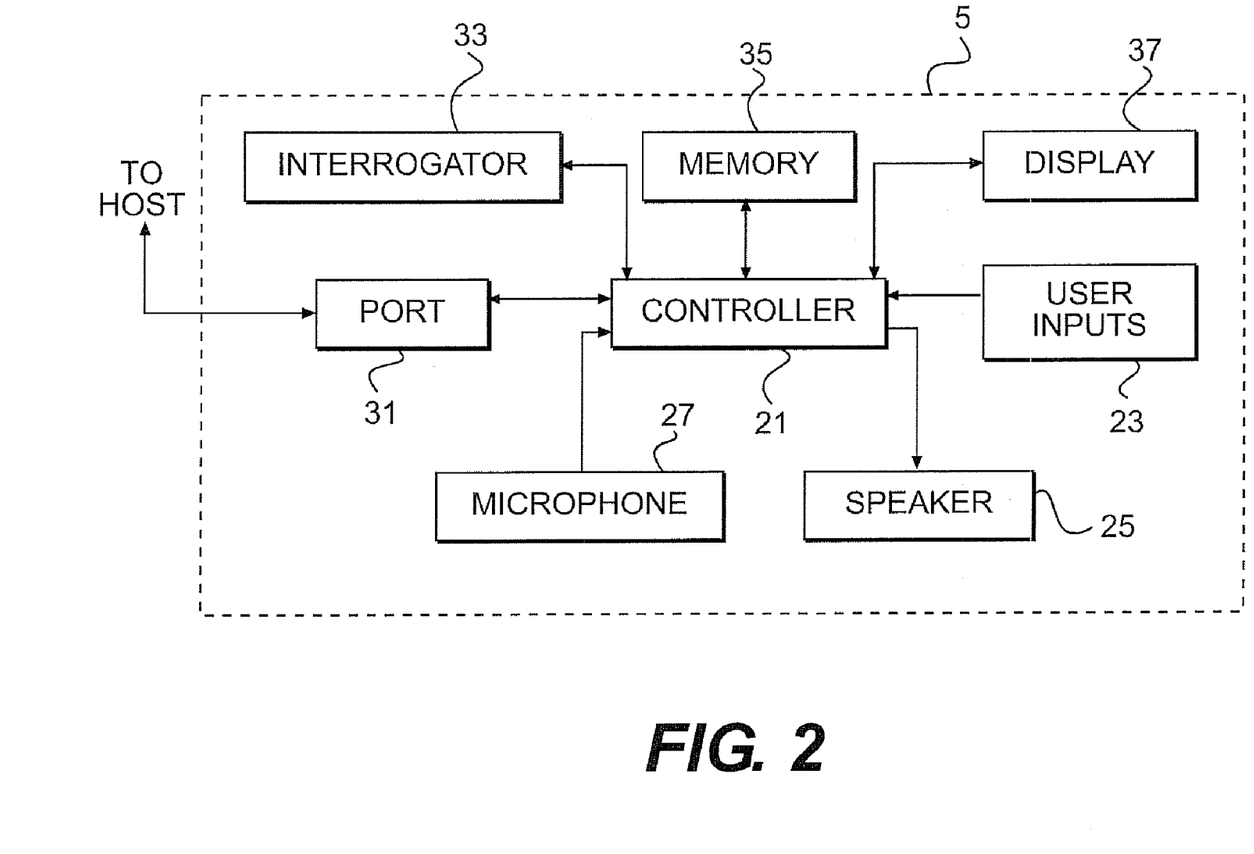
FIG. 2 is a block diagram of one embodiment of conference call equipment, in accordance with the present invention.

FIG. 2 is a block diagram of the telephone 5 of FIG. 1. The telephone 5 includes a controller 21. The controller 21 is connected to user inputs 23, a speaker 25, a microphone 27, an input/output port 31, an interrogator 33, a memory 35 and a display 37. One of more of these elements may be optional, depending upon the embodiment and features desired, as further discussed hereinafter.

Figure 3:
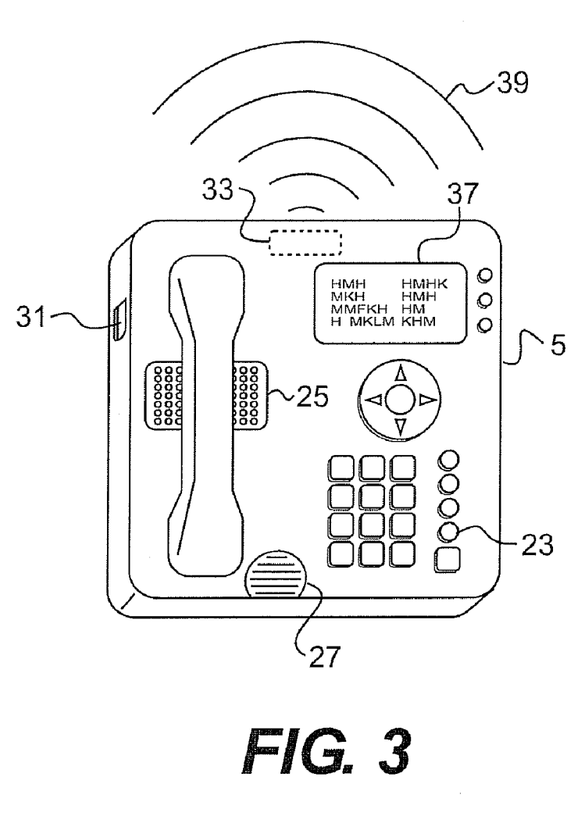
FIG. 3 is a perspective view illustrating a telephone having the conference call equipment of FIG. 2.

FIG. 3 is a perspective view illustrating the external features of the telephone 5. As can be seen in FIG. 3, the interrogator 33 is embedded within a housing of the telephone 5. In the illustrated embodiment, the interrogator 33 is a radio frequency identification (RFID) reader. Such RFID readers transmit a signal 39 to power a passive RFID tag and read a code emitted from the RFID tag, in a known manner.

In FIG. 3, user inputs 23 are depicted as push buttons, however the push button type inputs could be replaced by inputs via a touch screen in combination with the display 37, or even voice recognition software to receive user inputs. The port 31 is illustrated as a dedicated side port, however the port 31 may be any type of port including a wireless link or part of an RJ-type jack typically used on telephones.

Figure 4:
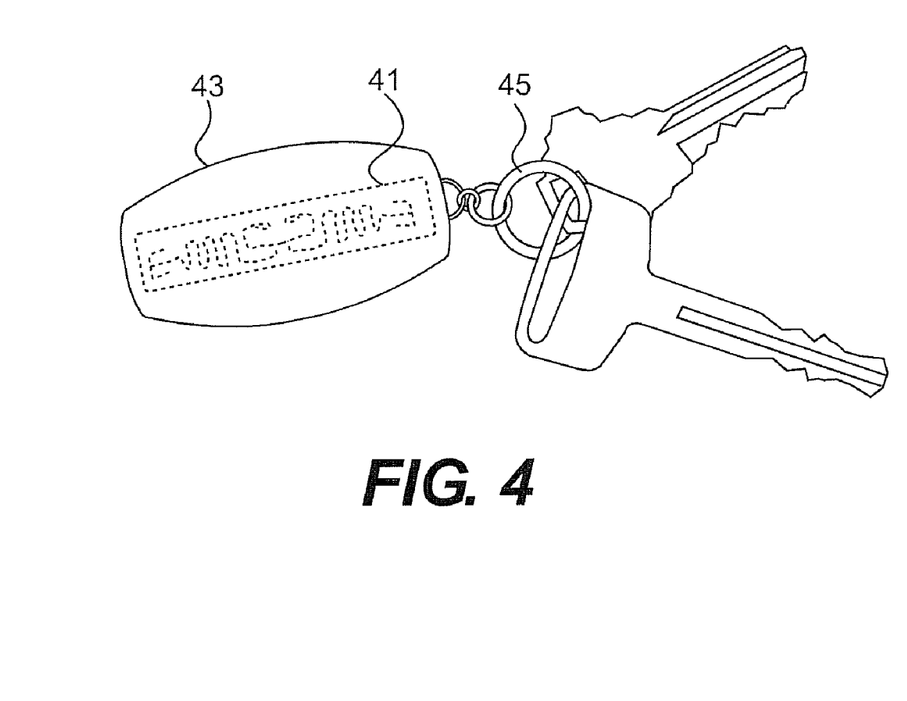
FIG. 4 is a perspective view of a fob, in accordance with the present invention.

FIG. 4 is a perspective view of one embodiment of an RFID tag 41 used in connection with the present invention. The RFID tag 41 is embedded within a fob 43. The fob 43 may be an ornamental object attached to a key ring 45. Alternatively, the fob 43 could be worn about a person's wrist or neck, or other portion of a person's body or clothing. When polled by the interrogator 33, the RFID tag 41 would emit a specific code associated to the identity of the person possessing the RFID tag 41. The code would be deemed a "person specific attribute," such that the code uniquely identifies the person to the conferencing system.

Figure 5:
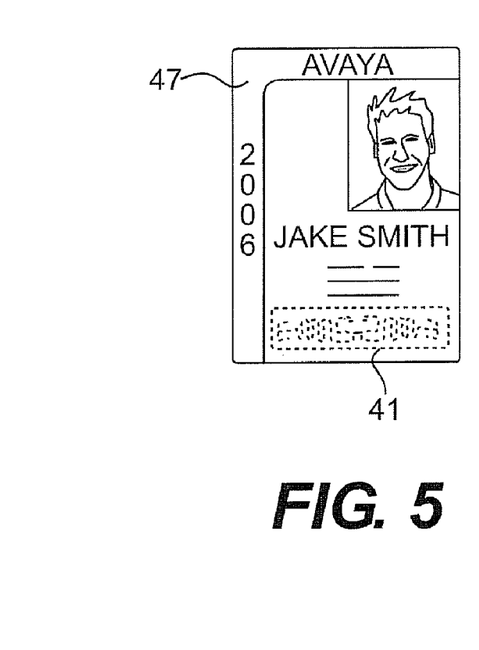
FIG. 5 is a perspective view of an employee ID card, in accordance with the present invention.

FIG. 5 illustrates yet another embodiment of the location of the RFID tag 41. The RFID tag may be embedded within an employee ID card 47. Alternatively, the RFID 41 may be embedded in other types of cards for carrying in a person's wallet, purse or pocket.

Figure 6:
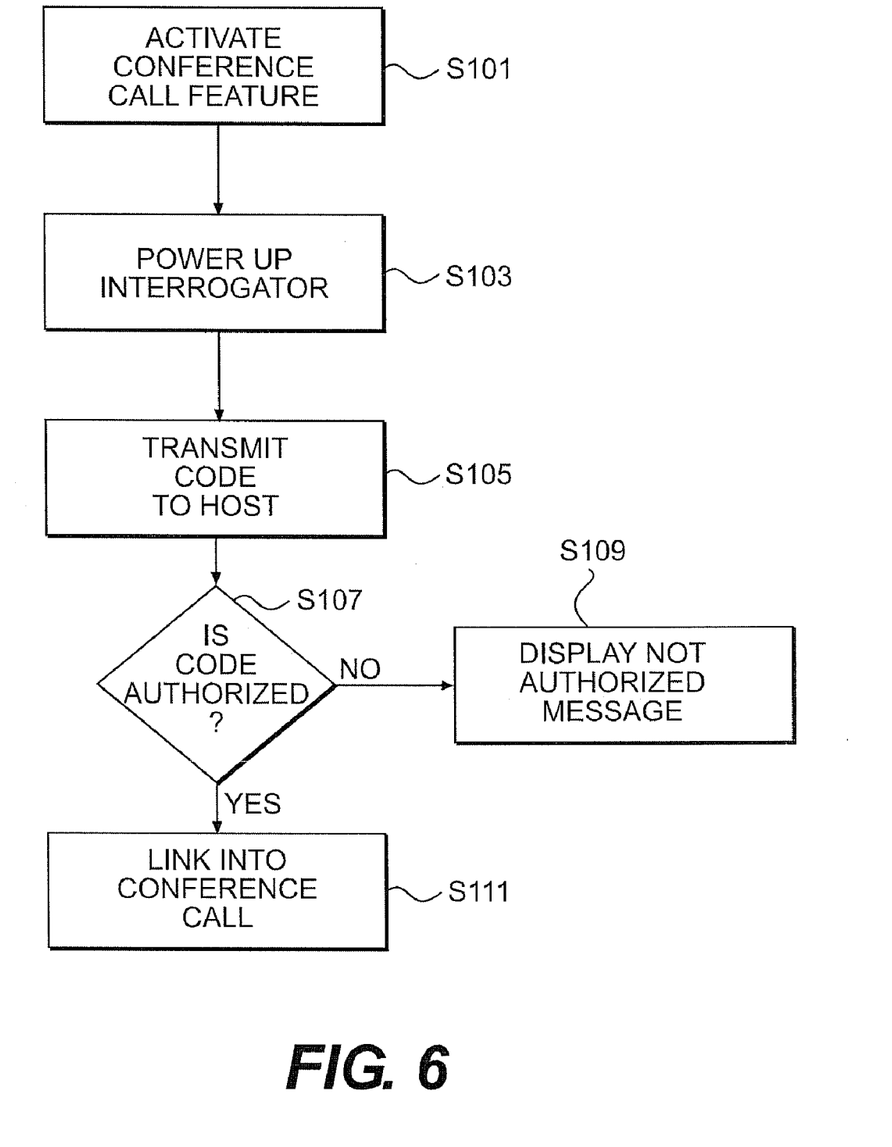
FIG. 6 is a flow chart illustrating a method of operation of the present invention.

Now a method of operating the present invention will be described with reference to FIG. 6. When a person believes that he is scheduled for a conference call that person presses a key of the user inputs 23 on the telephone 5 labeled "conference call." See Step S101. The input is received by the controller 21. In step S103, the controller 21 activates the interrogator 33 to read codes of RFID tags 41 in the vacinity of the interrogator 33 (e.g. within 15 feet, within 25 feet). There may be more than one RFID tag 41 within the vacinity, such as when several co-workers are gathered in one office.

Next, in step S105, the controller 21 transmits the read code or codes from the RFID tag or tags to the host 3. In step S107, the host 3 compares the code of the RFID tag 41 to data in the memory 1. The data in the memory 1 includes a list of all scheduled conference calls presently controlled by the host 3, and a list of potential participants, who are authorized to participate in the various conference calls.

If the code of the RFID tag 41 fails to match a participant code stored in the memory 1 for an ongoing or pending conference call, the host 3 alerts the controller 21 of this result, and processing proceeds to step S109. If the code of the RFID tag 41 matches a participant code stored in the memory 1 for an ongoing or pending conference call or calls, the host 3 alerts the controller 21 of this result, and processing proceeds to step S111.

In step S109, the controller 21 causes the display 37 to display a message that the user is not scheduled or authorized for any ongoing or pending conference call. A pending conference call may be defined as a conference call scheduled to take place within the next few minutes (e.g. within the next 5 minutes, or within the next 10 minutes). The display 37 may also inform the user as to the user's next scheduled conference call, as that information stored in the memory 1 could be transmitted from the host 3 to the controller 21. This feature would provide a convenient manner for an employee to check or verify his scheduled conference calls on a regular basis.

In step S111, the controller 21 is placed into communication with the conference call via the host 3. The controller 21 may immediately connect the conference call to the speaker 25 and microphone 27 of the telephone 5. Alternatively, the controller 21 may place the conference call on hold. Then, at the discretion of the user, the conference call may be taken off of hold and made active on the speaker 25 and microphone 27.

At any time during the conference call, the user may push another button of the user inputs 23 to receive real-time data about the conference call. The real-time data may be displayed on the display 37. The real-time data may include preset data, such as the topic of the conference call, originator of the conference call, a list of all authorized participants, start time and scheduled end time. The preset data would be stored in the memory 1 of the host 3 during the scheduling process of the conference call by the originator of the conference call. The real-time data may also include current data, such as a list of those actually on the conference call at the present moment, a list of those that were once present but have since dropped out of the conference call, the time each participant joined the conference call, the total time each participant participated, the location of each participant (e.g. the participant's telephone 5 could transmit a location code associated with the telephone 5 (e.g. room 1A-205, boardroom, cellular phone) to the host 3 along with the code of the RFID tag 41).

If a user were authorized to join more than one ongoing or pending conference call, then the host 3 would alert the controller 21 as to this situation. The controller 21 would cause the display 37 to list the authorized conference calls, such as by topic or originator. The user would be prompted to select one of the conference calls, such as by pressing a number on a keypad of the telephone 5. For example, the menu on the display might read, "accounting forecasts conference—press 1," and "new client development conference—press 2."

A benefit of the present invention is that the user need not remember a dial-in telephone number for the host 3, a conference call code, or a password, as the code of the RFID will bypass these procedural steps. Further, the user may easily move from room to room within a building and quickly and easily rejoin the conference call, as other telephones throughout the building of the employer may have the interrogator 33 of the present invention.

A further optional feature of the present invention would be to have the interrogator 33 periodically scan the vacinity for codes from RFID tags 41 (e.g. every few seconds or every minute), once a conference call was in progress on the telephone 5. Such a feature would enable the controller 21 to know if the authorized user is no longer present in the vacinity of the telephone 5. If it were sensed that the authorized user had left the vacinity, the controller 21 could disconnect the telephone 5 from the conference call. When the authorized user returned, he would reconnect to the conference call, if needed.

If the periodic scanning by the interrogator were employed on a constant basis, as opposed to only when a conference call was in session on the telephone 5, it would also be possible to bypass the step of requiring the user to press the "conference call" button of the user inputs 23. Rather, the employees desktop telephone 5 would simply scan the vacinity periodically and if a code of an RFID tag 41 were sensed, the controller 21 would poll the host 3 to see if the user associated with the code were authorized to be in a conference call. If so, the conference call would be placed on hold and an audible beep or ring would alert the user that a conference call was on hold on his desktop telephone 5. Further, the display 37 could display information about the conference call that is on hold.

The periodic scanning feature during a conference call could also improve the accuracy of the real-time data by updating the list of participating parties on a periodic basis. For example, if an authorized participant enters a room where another authorized participant is already engaged in the conference call, the second authorized participant would be sensed during a periodic scan by the interrogator 33 and added to the list of actual participants. Likewise, if an authorized participant left the room where other authorized participant were on a conference call, his absence from the conference call would be noted by the controller 21, reported to the host 3, and his name removed from the participating list. This real-time data could also be archived in the memory 1 of the host 3, so that records of individual conference calls and the attendance times of the participants could be reviewed at later dates, as needed.

Figure 7:
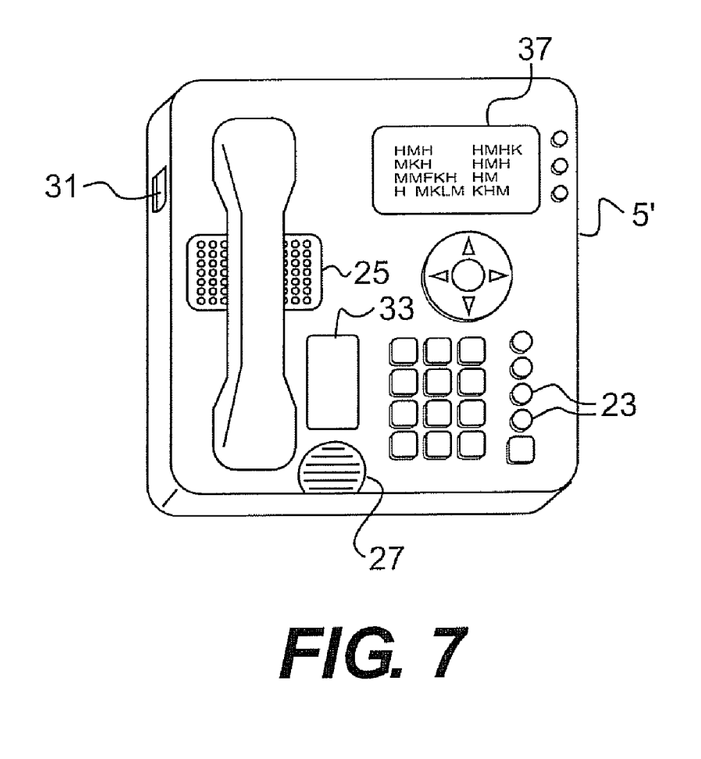
FIG. 7 is a perspective view illustrating an alternative telephone to the telephone of FIG. 3.
Figure 8:
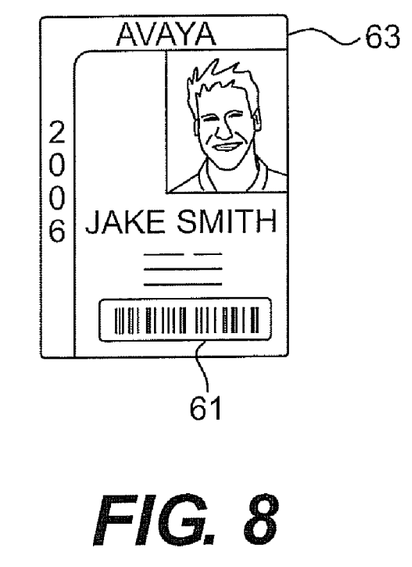
FIG. 8 is a perspective view of an alternative employee ID card.

FIG. 7 illustrates a second telephone 5', which is an alternative to the telephone 5 of FIG. 3. The difference between the telephones 5 and 5' resides in the modified interrogator 33'. The modified interrogator 33' is not an RFID scanner capable of scanning for a person specific attribute, like an RFID tag 41 in a vicinity of the telephone 5. Rather, the modified interrogator 33' would be a local scanner, which could only scan for a person specific attribute immediately presented to the interrogator 33'. Examples of the person specific attributes readable by the modified interrogator 33' could be a bar code 61 on an employee ID 63, as illustrated in FIG. 8. Of course, the bar code 61 could be printed on a different type card for carrying in the person's wallet, pulse or pocket.

The modified interrogator 33' could also take the form of a scanner to sense one or more physical characteristics of a person. For example, a finger print scanner, a retina scanner, or even software ran by the controller 21 to recognize a voice pattern of the user, as received by the microphone 27.

The modified interrogator 33' of FIG. 7 has tradeoffs in drawbacks and benefits, as compared to the RFID scanning interrogator 33 of FIG. 3. A drawback would be that the periodic scanning embodiment of operation for the modified interrogator 33' would not be conveniently employable. If periodic scanning for the remaining presence of an authorized user were to be employed with the modified interrogator 33', the user would need to periodically present the physical attribute (e.g. finger print) or bar code to the local scanner, which would be time consuming. As a benefit, if a physical characteristic of a person is to be scanned, the person can always log into a conference call. The risk that an employee ID or fob was forgot at home is not an issue.

The illustrated controller 21 could be a microprocessor, dedicated circuitry, a personal computer, or various combinations of hardware and software to enable operation of the conferencing equipment, as disclosed above.

Although FIGS. 3 and 7 illustrate a desktop type telephone 5 and 5', the principals of the invention are equally applicable a cellular telephone 9 or a personal computer 11 interfacing with the host 3.

Also, as an alternative embodiment, the placement of the interrogator and specific attribute may be reversed. In the alternative embodiment, each employee would carry an interrogator. The interrogator could be a separate piece of equipment, or more preferably would be integrated into a cellular telephone and be powered by the cellular telephone's battery. The specific attribute would be a unique label (e.g. RFID tag, bar code) attached to each communication device throughout the business complex.

In the alternative embodiment, when a person is scheduled for a conference call that person is sent a notification from his home presence system. The notification reminds the user of the conference and asks him if he would like to use a local device for the call. If yes, the interrogator of the cellular telephone is thereby activated to read a code of an RFID tag placed on a nearby piece of conference call equipment.

Next, the cellular telephone transmits the read code from the RFID tag to the host. A display of the cellular telephone may display messages to the user regarding the conference call status, as described in conjunction with FIG. 6, above. The display of the cellular telephone may also inform the user as to the user's next scheduled conference call, as that information stored in the memory could be transmitted from the host to the cellular telephone. This feature would provide a convenient manner for an employee to check or verify his scheduled conference calls on a regular basis.

If the employee is scheduled for a conference call, the communication device associated with the read RFID tag is placed into communication with the conference call via the host. The RFID tag, which was read by the interrogator of the cellular telephone and transmitted to the host, may contain enough information (e.g. telephone number, Internet address, network address) for the host to forward the conference call directly to the communication device. Alternatively, the host may be connected to a memory which stores a database of RFID codes, which are each linked to the telephone number, Internet address, or network address for the particular communication device associated with the RFID code.

The communication device may immediately have the conference call connected to its speaker and microphone. Alternatively, the conference call may be placed on hold. Then, at the discretion of the user, the conference call may be taken off of hold and made active on the speaker and microphone.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. Conferencing equipment comprising:
   a controller;
   a microphone for receiving a voice of a conference call participant;
   a speaker for outputting the voices of participants of the conference call; and
   an interrogator for reading information stored in a physical, person specific object,
   wherein said controller controls said microphone, speaker and interrogator and is adapted to transmit data relating to the read information to a host server of the conference call and to receive participant data from the host server as to whether or not the person associated with the physical, person specific object is permitted access to a conference call.

2. The equipment of claim 1, wherein said interrogator is a bar code scanner.

3. The equipment of claim 1, wherein said interrogator is selected from the group consisting of a fingerprint scanner, a retina scanner, and a face scanner.

4. The equipment of claim 1, further comprising:
   a user input, wherein when a user activates said user input, said controller causes said interrogator to read the information stored in the physical, person specific object.

5. The equipment of claim 1, wherein at predetermined intervals, said controller controls said interrogator to search for and read any present physical, person specific object.

6. The equipment of claim 1, further comprising:
   a display controlled by said controller, wherein said display indicates if the person associated with the physical, person specific object is authorized to join one or more conference calls; and
   an input connected to said controller for receiving a person's input selecting to join one of the one or more open conference calls,
   wherein said controller takes the person's input and subsequently joins said microphone and speaker to the selected conference call.

7. The equipment of claim 1, wherein the physical person specific object comprises a fob or a card having an RFID chip or a bar code.

8. The equipment of claim 1, wherein the physical, person specific object comprises a part of a body of the conference call participant.

9. Conferencing equipment comprising:
   a controller;
   a microphone for receiving a voice of a conference call participant;
   a speaker for outputting the voices of participants of the conference call; and
   an interrogator for reading a person specific attribute,
   wherein said controller controls said microphone, speaker and interrogator and is adapted to transmit data relating to the read person specific attribute to a host server of the conference call and to receive participant data from the host server as to whether or not the person associated with the person specific attribute is permitted access to a conference call,
   wherein said interrogator is a radio frequency identification (RFID) tag scanner.

10. Conferencing equipment comprising:
    a controller;
    a microphone for receiving a voice of a conference call participant;
    a speaker for outputting the voices of participants of the conference call;
    a person specific attribute for carrying by a person; and
    an interrogator for reading said person specific attribute,
    wherein said controller controls said microphone, speaker and interrogator and is adapted to transmit data relating to the read person specific attribute to a host server of the conference call and to receive participant data from the host server as to whether or not the person associated with the person specific attribute is permitted access to a conference call.

11. The equipment of claim 10, wherein said person specific attribute is a radio frequency identification (RFID) tag.

12. The equipment of claim 11, wherein said RFID tag is incorporated into an identification card carried by the person.

13. The equipment of claim 11, wherein said RFID tag is incorporated into a fob.

14. The equipment of claim 13, wherein said fob is adapted to be worn on the neck, wrist or a key chain of the person.

15. The equipment of claim 10, wherein said person specific attribute is a bar code on a card carried by the person.

16. A method of operating equipment capable of linking to a conference call comprising the steps of:
    operating an interrogator to read information stored in a physical, person specific, object;
    transmitting data representing the read information to a host; and
    receiving data from the host indicating whether or not the user of the equipment is authorized to join a conference call.

17. The method of claim 16, further comprising:
    if the user of the equipment is not authorized to join a conference call, displaying an indication that no conference call is available or authorized;

if the user of the equipment is authorized to join a conference call, joining the conference call or placing the conference call on hold for the user to answer.

18. The method of claim 16, wherein if the user of the equipment is authorized to join more than one conference call, said method further comprising:
displaying a list of the authorized conference calls;
receiving an input from the user selecting a desired conference call from the list; and
joining the selected conference call.

19. The method of claim 16, wherein the user of the equipment manually selects a conference call function of the equipment to initiate said operating step of the interrogator.

20. The method of claim 16, wherein periodically, said operating step of the interrogator is automatically performed.

21. The method of claim 20, wherein if a conference call is presently linked to the equipment, and an authorized physical, person specific object is no longer able to be read by the interrogator, the conference call is disconnected from the equipment.

22. A method of checking a status of conference calls comprising:
activating a conference call feature on a telephone;
entering a person specific attribute in the telephone;
sending the person specific attribute to a host;
comparing the person specific attribute to a list of upcoming conference calls and their respective authorized participants;
sending results of said comparing step to the telephone; and
displaying the results at the telephone,
wherein the results include information about any upcoming conference calls for which the user associated with the person specific attribute is authorized to access.

23. The method of claim 22, wherein the information about any upcoming conference calls includes at least a start time of the scheduled conference call or calls.

24. The method of claim 22, wherein said entering step includes scanning the person specific attribute by an interrogator of the telephone.

25. A method of operating equipment capable of linking to a conference call comprising:
operating an interrogator of the equipment to read a specific attribute associated with a communication device;
transmitting data representing the read specific attribute to a host; and
connecting the conference call to the communication device.

26. The method of claim 25, wherein the equipment is a cellular telephone and further comprising: sending a notification to the cellular telephone that a user of the cellular telephone is scheduled for an upcoming conference call, prior to said operating step.

* * * * *